United States Patent [19]

Bolli

[11] Patent Number: 4,519,495
[45] Date of Patent: May 28, 1985

[54] APPARATUS FOR SEPARATING AND CONVEYING OBJECTS

[75] Inventor: Hans-Ulrich Bolli, Schleitheim, Switzerland

[73] Assignee: SIG - Schweizerische Industrie-Gesellschaft, Neuhausen am Rheinfall, Switzerland

[21] Appl. No.: 375,100

[22] Filed: May 5, 1982

[30] Foreign Application Priority Data

May 6, 1981 [CH] Switzerland ............... 2945/81

[51] Int. Cl.³ ............................... B65G 25/00
[52] U.S. Cl. .................... 198/486; 198/456; 198/487
[58] Field of Search ............ 198/457, 486, 487, 653, 198/694, 740, 456

[56] References Cited

U.S. PATENT DOCUMENTS 3,166,181 1/1965 Rutkus et al. ............... 198/457
3,453,800 7/1969 Mahncke ............... 198/456 X

FOREIGN PATENT DOCUMENTS 447964 5/1936 United Kingdom.
1254601 11/1971 United Kingdom.
1360888 7/1974 United Kingdom.
1413970 11/1975 United Kingdom.

Primary Examiner—Joseph E. Valenza
Assistant Examiner—Jonathan D. Holmes
Attorney, Agent, or Firm—Spencer & Frank

[57] ABSTRACT

An apparatus for separating and conveying substantially rectangular, plate-like objects has a delivery conveyor, a removal conveyor situated adjacent the delivery conveyor and having a transporting direction substantially parallel to the transporting direction of the delivery conveyor; and a fork gripper mechanism for sequentially transferring the objects from the delivery conveyor to the removal conveyor. The fork gripper mechanism includes two rotationally movably mounted gripper fingers arranged for gripping one object at a time on the delivery conveyor and a drive for moving the gripper fingers towards one another to grip an object on the delivery conveyor, for translating the gripper fingers with the object from the delivery conveyor to the removal conveyor at an obtuse angle with the transporting direction so that during the transfer of the object from the delivery conveyor to the removal conveyor the object is displaced by a given distance in the transporting direction, for moving the gripper fingers away from one another to release the object on the removal conveyor, and for lifting the gripper fingers on a return path over the objects on the removal conveyor and on the delivery conveyor.

4 Claims, 4 Drawing Figures

APPARATUS FOR SEPARATING AND CONVEYING OBJECTS

BACKGROUND OF THE INVENTION

The present invention relates to an apparatus for separating and conveying substantially rectangular, plate-like objects.

The apparatus is of the type that has an endless, stepwise advanced delivery conveyor on which the objects are carried while in a lengthwise contact with one another. The objects are pushed from the delivery conveyor to a continuously advanced removal conveyor which extends at least approximately parallel to the delivery conveyor and which has object carrier members determining the spacing between successive objects on the removal conveyor.

Various such apparatuses are known with which flat objects delivered in an uninterrupted series are shifted from a first conveying member to a second conveying member with which they are transported uniformly spaced.

For example, in Swiss Pat. No. 489,412 an apparatus is disclosed wherein, for the purpose of saving time, the first conveying member is operated continuously and the objects are lifted up by means of a fork gripper and deposited on the second conveying member.

According to Swiss Pat. No. 540,180, this arrangement has been improved relative to the structural design necessitated by the additional movement performed by the fork gripper, involves high expenditures in addition to limiting the operating speed. Instead of the fork gripper, a pusher is provided with which the objects are pushed from one conveying member to the other conveying member. The pusher is moved along a closed curve. In this way it is possible to also absorb dimensional tolerances in the objects.

In all known devices, the movement of the second conveying member and the movement of the transfer means back over the first conveying member must be synchronized with the movement of the first conveyor member. This is done either in that the first conveying member operates discontinuously, i.e. in steps, or in that the first conveying member is operated continuously but at a considerably slower speed. Even if the second conveying member were able to be operated faster, there would still occur a delay caused by the return movement of the transfer means or by the limited acceleration of the transfer means and/or of the first conveying member.

SUMMARY OF THE INVENTION

It is an object of the invention to provide an improved apparatus of the above-outlined type which permits acceleration of the transfer and separation of the objects without increasing the acceleration of the first conveying member in such a way that the objects slide on the belt of the first conveying member.

This object and others to become apparent as the specification progresses, are accomplished by the invention, according to which, briefly stated, the apparatus has an endless delivery conveyor, a removal conveyor situated adjacent the delivery conveyor and having a transporting direction substantially parallel to the transporting direction of the delivery conveyor; and a fork gripper mechanism for sequentially transferring the objects from the delivery conveyor to the removal conveyor. The fork gripper mechanism includes two rotationally movably mounted gripper fingers arranged for gripping one object at a time on the delivery conveyor and a drive for moving the gripper fingers towards one another to grip an object on the delivery conveyor, for translating the gripper fingers with the object from the delivery conveyor to the removal conveyor at an obtuse angle with the transporting direction so that during the transfer of the object from the delivery conveyor to the removal conveyor the object is displaced by a given distance in the transporting direction, for moving the gripper fingers away from one another to release the object on the removal conveyor, and for lifting the gripper fingers on a return path over the objects on the removal conveyor and on the delivery conveyor.

DESCRIPTION OF THE PREFERRED EMBODIMENT

Figure 1:
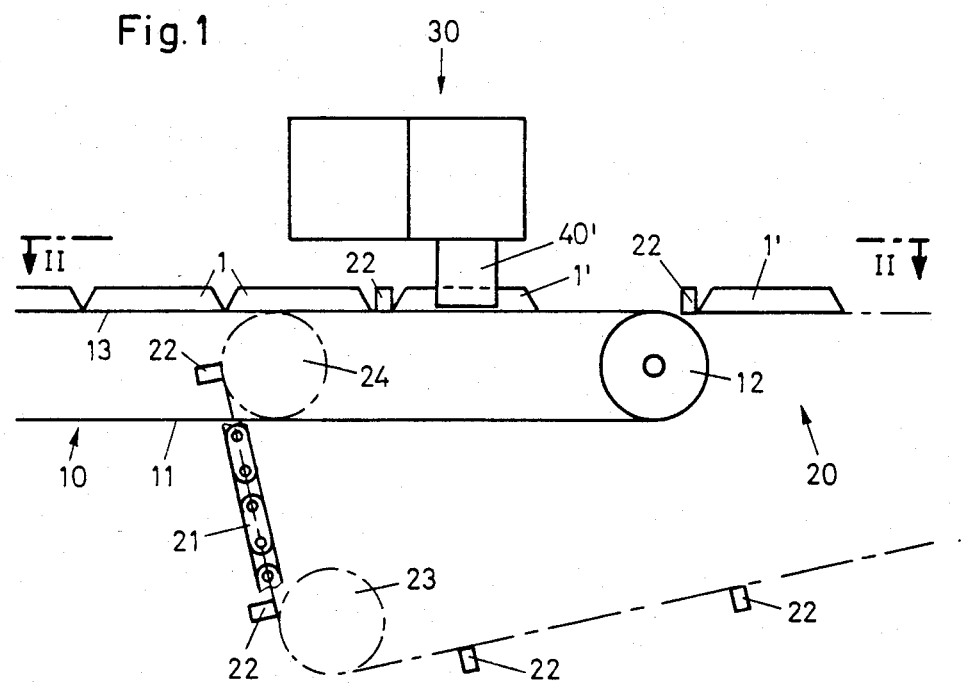
FIG. 1 is a front elevational view of a preferred embodiment of the invention.
Figure 2:
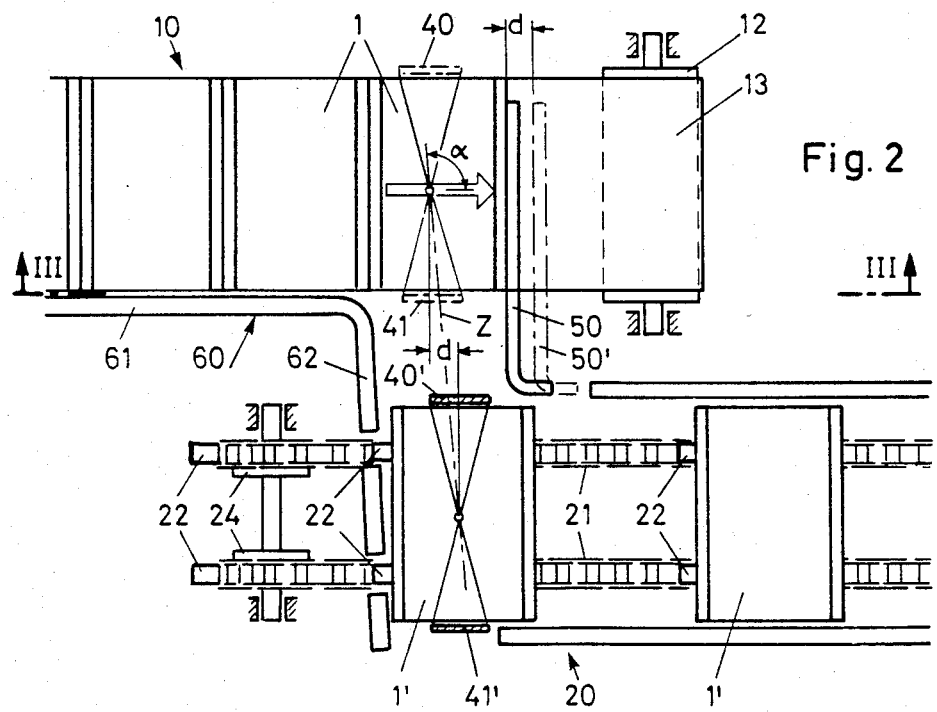
FIG. 2 is a top plan view, partially in section, of the preferred embodiment taken along line II—II of FIG. 1.

The illustrated apparatus, according to FIGS. 1 and 2, includes a delivery conveyor 10 with an end roller 12 and a delivery belt 11 on whose upper reach 13 objects 1 are transported in steps from the left to the right in the drawing. Spaced from delivery conveyor 10 and substantially parallel thereto, there is disposed a removal conveyor 20, including two guide rollers 23, 24, a partially shown conveying chain 21 and equidistantly disposed pusher lugs 22. The objects 1' conveyed thereby are spaced equidistantly.

A fork gripper arrangement 30 having two gripper fingers 40, 41 is provided to shift the objects 1 from the delivery conveyor 10 to the removal conveyor 20. The structure and operation of the fork gripper arrangement will be described below.

Figure 3:
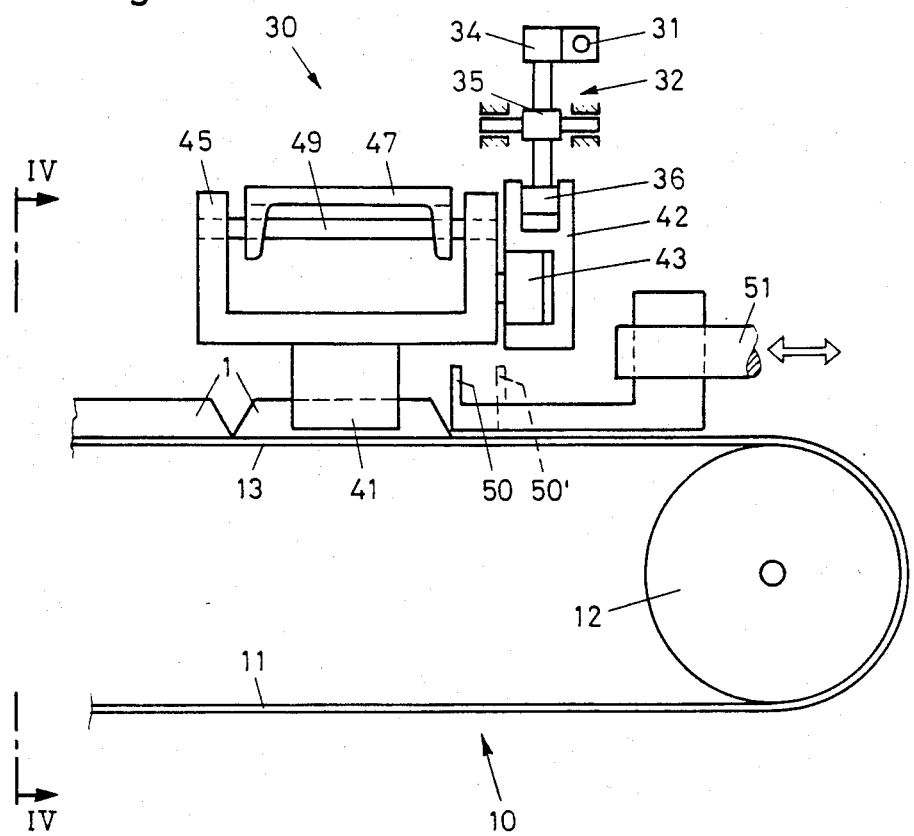
FIG. 3 is an enlarged front elevational view taken along line III—III of FIG. 2.

A movable plate 50 is controlled, according to FIGS. 2 and 3, by a push rod 51 and is arranged to be displaceable between two end positions which are shown in FIG. 2 in solid lines and in dashed lines (the latter is designated at 50'). A guide element 60 has a first arm 61 which is parallel to the edge of the delivery conveyor 10 and a second arm 62 which forms an obtuse angle with the first arm 61. The second arm 62 traverses the removal conveyor 20, also at the obtuse angle with respect to the conveying direction and has recesses to allow passage of the pusher lugs 22. The guide element 60 serves to guide the objects 1 during transport from the delivery conveyor 10 to the removal conveyor 20 in order to prevent the object from rotating about a vertical axis on the conveyor belt 11 as a result of friction forces. The axis Z in FIG. 2 indicates the direction of displacement of the fork gripper 30. The path d represents the distance travelled by the gripper fingers 40, 41 in the transporting direction of the delivery conveyor 10, and also corresponds to the displacement of the abutment plate 50.

Figure 4:
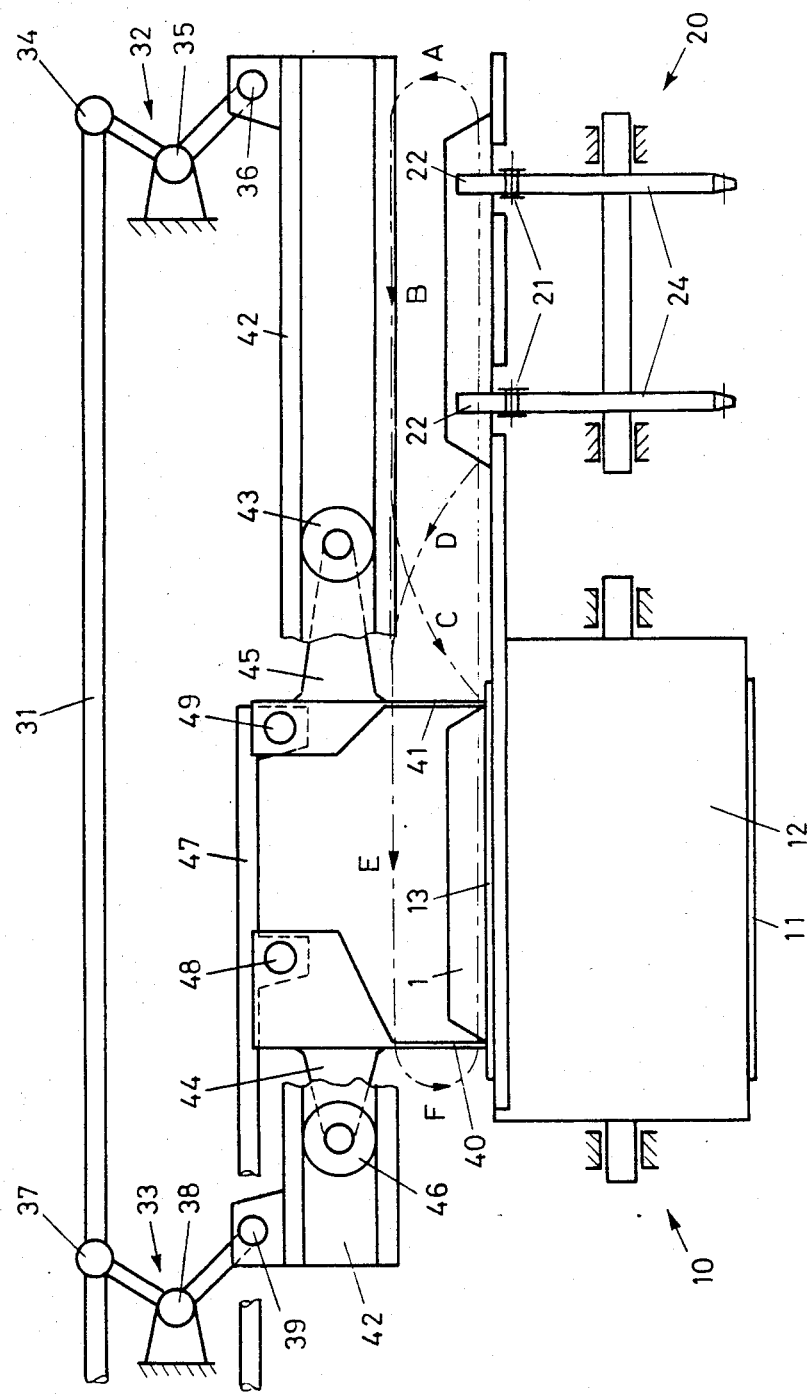
FIG. 4 is a side elevational view of the preferred embodiment taken along line IV—IV of FIG. 3.

Turning now to FIGS. 3 and 4, the two gripper fingers 40, 41 are fastened rigidly to rotary mounts 44, 45. The rotary mounts 44, 45 are articulated to a push rod 47 by means of axles 48, 49 and are provided with guide rollers 43, 46 which are guided in a longitudinally displaceable manner in the U-shaped recess of a guide rail 42. The guide rail 42 itself is articulated to an actuating rod 31 by means of bell crank levers 32, 33 which are rotatably mounted at their fulcrums on support blocks 35, 38 which are fixed to the machine frame and whose ends 34, 37 are articulated to the actuating rod 31. Their other ends 36, 39 are articulated to the guide rail 42.

The push rod 47 produces a back and forth horizontal movement of the fork gripper 30 with its gripper fingers 40, 41.

A downward vertical movement caused by rightward movement of actuating rod 31 causes gripper fingers 40, 41 to rotate inwardly and grip the next-in-line object 1 on delivery conveyor 10. Rightward horizontal movement of push rod 47 translates gripper fingers 40, 41 to displace the object to removal conveyor 20 at which point an upward vertical movement caused by a leftward movement of actuating rod 31 causes gripper fingers 40, 41 to rotate outwardly and thus come loose from object 1'. Leftward movement of push rod 47 will then cause gripper fingers 40, 41 to slide over object 1' and the next-in-line object 1 on delivery conveyor 10 where it is in position to move down and grip the next object 1.

The drives of the push rod 47 and of the actuating rod 31 on the one hand, and of the abutment plate 50 on the other hand, operate in synchronism and can be realized in a known manner by cam plates and sensing rollers via levers and rods, with the cam plates being seated on a common shaft in order to generate synchronous movement. Since such drives are generally known in the packaging machine art, a detailed description thereof is not provided.

Thus, the gripper finger 41 at its point of reversal travels over the removal conveyor 20, as shown by the dashed line in FIG. 4, first on a circular path A, then on a translatory linear path B and finally on a curved path C. The gripper finger 40 travels, in the reverse sequence, first on a curved path D, then on a linear path E and finally on a circular path F.

The push rod 47 thus performs a harmonically oscillating movement and the actuating rod 31 moves in the two end positions of the push rod 47. This avoids jerky movement of the fork gripper 30 and a combination of the two movements at the gripper fingers 40, 41 permits simultaneous return of the fork gripper and advance of the delivery conveyor, which results in a considerable saving of time. Due to the fact that the axis Z of the path of the fork gripper 30 forms an obtuse angle $\alpha$ with the transporting direction T of the delivery conveyor 10 (FIG. 2), the further transporting of the delivery conveyor 10 can begin as soon as the fork gripper 30 has begun its displacement path. In this way, output can be increased without having to increase the acceleration of the delivery conveyor 10 and sliding of the objects 1 on the delivery belt 11 in the transporting direction T is minimized.

It will be understood that the above description of the present invention is susceptible to various modifications, changes and adaptations and the same are intended to be comprehended within the meaning and range of equivalents of the appended claims.

I claim:

1. An apparatus for separating and conveying substantially rectangular, plate-like objects comprising:

(a) a delivery conveyor for transporting the objects in a transporting direction;

(b) a removal conveyor situated adjacent said delivery conveyor and having a transporting direction substantially parallel to the transporting direction of said delivery conveyor; and (c) fork gripper means for sequentially sliding the objects from said delivery conveyor onto said removal conveyor, said fork gripper means including (1) two rotationally movably mounted gripper fingers arranged for gripping one object at a time on said delivery conveyor at two oppositely disposed sides of the object parallel to the transporting direction of said delivery conveyor, and (2) drive means for moving said gripper fingers towards one another to grip an object at a height level on the delivery conveyor, for translating said gripper fingers with the object, at said height level, from said delivery conveyor to said removal conveyor at an obtuse angle with the transporting direction so that during the transfer of the object from said delivery conveyor to said removal conveyor the object is displaced by a given distance in the transporting direction, for moving said gripper fingers away from one another to release the object on the removal conveyor, and for lifting said gripper fingers on a return path over the objects on the removal conveyor and on the delivery conveyor, said drive means including guide rail means articulated to said gripper fingers; push rod means for moving said gripper fingers as a unit transversely between said delivery conveyor and said removal conveyor at said obtuse angle; said gripper fingers being articulated to said push rod means; and actuating rod means operatively connected to said guide rail means to displace said guide rail means in a direction having a component perpendicular to the direction of movement of said push rod means to pivot said gripper fingers on said push rod means towards or away from one another.

2. An apparatus as defined in claim 1 wherein said removal conveyor comprises a plurality of pusher lugs travelling and spaced from one another, in said transporting direction; further comprising a guide element including a first arm parallel to a side edge of said delivery conveyor and a second arm which forms an obtuse angle with said first arm and extends transversely across said removal conveyor, said second arm being provided with recesses to permit passage of said pusher lugs.

3. An apparatus as defined in claim 1 further comprising an abutment plate extending across said delivery conveyor transverse to the transporting direction thereof and downstream of said fork gripper means as viewed in the transporting direction and a push rod connected to said abutment plate for moving said abutment plate parallel to said transporting direction of said delivery conveyor.

4. An apparatus for separating and conveying substantially rectangular, plate-like objects comprising:

(a) a delivery conveyor for transporting the objects in a transporting direction;

(b) a removal conveyor situated adjacent said delivery conveyor and having a transporting direction substantially parallel to the transporting direction of said delivery conveyor; and (c) fork gripper means for sequentially sliding the objects from said delivery conveyor onto said removal conveyor, said fork gripper means including (1) two rotationally movably mounted gripper fingers arranged for gripping one object at a time on said delivery conveyor at two oppositely disposed sides of the object parallel to the transporting direction of said delivery conveyor, and (2) drive means for moving said gripper fingers towards one another to grip an object at a height level on the delivery conveyor, for translating said gripper fingers with the object, at said height level, from said delivery conveyor to said removal conveyor at an obtuse angle with the transporting direction so that during the transfer of the object from said delivery conveyor to said removal conveyor the object is displaced by a given distance in the transporting direction, for moving said gripper fingers away from one another to release the object on the removal conveyor, and for lifting said gripper fingers on a return path over the objects on the removal conveyor and on the delivery conveyor; said drive means including (i) a push rod means for moving said gripper fingers as a unit transversely between said delivery conveyor and said removal conveyor at said obtuse angle; said gripper fingers being articulated to said push rod means;

(ii) guide rollers mounted on said gripper fingers;

(iii) a guide rail receiving said guide rollers;

(iv) an actuating rod means connected to said guide rail for displacing said guide rail to pivot said gripper fingers on said push rod means towards or away from one another, said actuating rod means extending parallel to and being spaced from said guide rail; and (v) stationarily supported bell crank levers connecting said actuating rod means with said guide rail.

* * * * *